United States Patent
Chaouki Almagro et al.

(10) Patent No.: US 11,867,824 B2
(45) Date of Patent: Jan. 9, 2024

(54) SOLAR TRACKER COMMISSIONING

(71) Applicant: SOLTEC INNOVATIONS, S.L., Molina de Segura (ES)

(72) Inventors: Samir Chaouki Almagro, Molina de Segura (ES); Francisco Javier Carpio Obre, Molina de Segura (ES); Abraham Ramli Rosique, Molina de Segura (ES)

(73) Assignee: SOLTEC INNOVATIONS S.L., Molina de Segura (ES)

( * ) Notice: Subject to any disclaimer, the term of this patent is extended or adjusted under 35 U.S.C. 154(b) by 0 days.

(21) Appl. No.: 18/008,157

(22) PCT Filed: Jun. 1, 2021

(86) PCT No.: PCT/ES2021/070391
§ 371 (c)(1),
(2) Date: Dec. 2, 2022

(87) PCT Pub. No.: WO2021/245308
PCT Pub. Date: Dec. 9, 2021

(65) Prior Publication Data
US 2023/0194645 A1    Jun. 22, 2023

(30) Foreign Application Priority Data

Jun. 4, 2020 (EP) .................................... 20178231

(51) Int. Cl.
*G01S 3/78* (2006.01)
*H04W 84/18* (2009.01)
*G01S 3/786* (2006.01)

(52) U.S. Cl.
CPC ........... *G01S 3/7861* (2013.01); *H04W 84/18* (2013.01)

(58) Field of Classification Search
CPC ............................ G01S 3/7861; H04W 84/18
(Continued)

(56) References Cited

U.S. PATENT DOCUMENTS 7,962,249 B1  6/2011  Zhang et al.
8,452,461 B2  5/2013  Sawyer et al.
(Continued)

FOREIGN PATENT DOCUMENTS

EP    2722959 B1    6/2019

OTHER PUBLICATIONS

Article titled "Design of PID controller for sun tracker system using QRAWCP approach", authored by Sandeep D. Hanwate and Yogesh V. Hote, published in International Journal of Computational Intelligence Systems, vol. 11 (2018) pp. 133-145 in 2018, accepted for publication Jul. 26, 2017.
(Continued)

*Primary Examiner* — Michael J Brown
(74) *Attorney, Agent, or Firm* — Hassan Abbas Shakir; Shakir Law PLLC

(57) ABSTRACT

The invention relates to electric solar trackers moving solar panels and being controlled by a solar tracker controller. More precisely the object of the invention is aimed to a commissioning procedure of solar power plants. The invention accounts for a mesh communications network, multiple gateways respectively associated to each solar tracker controller; the gateways acting between the mesh communication network and a solar plant communications system wherein each solar tracker controller is assigned a unique serial number comprising ID, position on the solar plant of the solar tracker associated to the solar tracker controller. The gateway determining a solar tracker as being available for commissioning and sending configuration data to the solar tracker controller of the solar tracker available for
(Continued)

commissioning, the configuration data including information of auxiliary gateways to connect to in case a primary gateway fails.

9 Claims, 2 Drawing Sheets

(58) Field of Classification Search
USPC .......................................................... 700/286
See application file for complete search history.

(56) References Cited

U.S. PATENT DOCUMENTS

| | | | |
|---|---|---|---|
| 8,502,129 B2 | 8/2013 | Miller et al. | |
| 8,916,811 B2 | 12/2014 | Miller et al. | |
| 10,750,433 B1* | 8/2020 | Shukla | H04W 48/10 |
| 2010/0083356 A1 | 4/2010 | Steckley et al. | |
| 2012/0158197 A1* | 6/2012 | Hinman | F24S 25/12 |
| | | | 700/287 |
| 2012/0158200 A1 | 6/2012 | Vandevelde et al. | |
| 2015/0365320 A1* | 12/2015 | Xu | H04L 47/41 |
| | | | 370/226 |
| 2017/0187192 A1* | 6/2017 | Jeanty | H02S 20/32 |
| 2017/0279630 A1 | 9/2017 | Anderson et al. | |

OTHER PUBLICATIONS

International Search Report for related PCT patent application PCT/ES2021/070391 issued by the European Patent Office and dated Jul. 14, 2021, English version provided.

Written Opinion of the International Searching Authority for related PCT patent application PCT/ES2021/070391 issued by the European Patent Office and dated Jul. 14, 2021, English version provided.

* cited by examiner

SOLAR TRACKER COMMISSIONING

CROSS-REFERENCE TO RELATED APPLICATIONS

This application is a national stage under 35 U.S.C. § 371 of PCT patent application PCT/ES2021/070391 filed on 1 Jun. 2021, which is pending and which is hereby incorporated by reference in its entirety for all purposes. PCT/ES2021/070391 claims priority to European Patent Application 20178231.5 filed on 4 Jun. 2020, which is hereby incorporated by reference in its entirety for all purposes.

OBJECT OF THE INVENTION

The invention relates to the technical field of renewable energies and more particularly to solar energy.

The object of the invention is directed to managing and controlling a group of single axis solar trackers providing a plant commissioning required for the start-up of a solar PV power plant and the correct application of monitoring of solar trackers.

BACKGROUND ART

Once an installation of any PV solar plant and the correspondent following inspection are complete, the plant is ready to be plugged into the grid to transfer power, this process is known as commissioning. Commissioning of a photovoltaic PV system validates that the system is designed, installed, and working according to requirements. Besides, commissioning procedures, prevent the waste of resources thus saving time and money; therefore, ensuring systems efficiency and safety and increasing effectiveness and productivity. It is considered an essential part of a PV solar power plant, as PV commissioning entails easiness of future operations and maintenance.

Commissioning procedures may vary depending on the solar plant size and design; but, regardless of size and design, a part of the procedure commissioning a PV solar plant involves commissioning the solar tracking system. Said commissioning of the solar trackers requires setting up the tracker controller by providing the operating parameters for each solar tracker controller, therefore to the correspondent sola tracker. These parameters may include the system location, which is defined by its longitude and latitude.

Without accurate location information and panel position information, the solar tracker controller will not be able to accurately determine the exact location of the sun at a given time.

Commissioning procedures require solar tracker controllers to be properly configured with the respective configuration parameters so the solar tracker controller may operate. Solutions found in the art require an operator directly accessing the solar tracker controller, either through near field communication means or through other direct connection means, in order to provide the solar tracker controller with said configuration parameters; therefore, involving the physical presence of an operator nearby the solar tracker.

U.S. Pat. No. 8,502,129B2 discloses integrated remotely controlled photovoltaic system having several components. In U.S. Pat. No. 8,502,129B2, a central backend server management system is configured to facilitate management of two or more solar arrays at a remote site from a client device connected over a public wide area network (WAN). An integrated electronics housing contains multiple circuits, including AC power generation inverter circuits and solar array motion control circuits, for one or more photovoltaic (PV) solar arrays at the remote site. The multiple circuits cohesively exist in the integrated electronics housing and perform better because of the interconnectivity. The communication circuitry within the integrated electronics housing is configured to establish secure communications over the WAN with the central backend server management system. In U.S. Pat. No. 8,502,129B2, the integrated electronics housing acts as the local system control point for at least one or more solar arrays.

U.S. Pat. No. 8,452,461B2 discloses a control system for a photovoltaic power plant that includes a plant-level control system for implementing plant-level control functions at power generation sites of the plant, a supervisory system for supervisory control and data acquisition of the plant, and a communications network connecting the plant-level control system, the supervisory system, and plant devices is described. U.S. Pat. No. 8,452,461B2 provides methods for controlling a PV plant using the plant-level control system and the supervisory system and methods for regulating power characteristics in power generation sites. The communications network provides communications among said plant devices, said plant-level control system, and said supervisory system; in this sense collected measured AC/DC power values are shared using the communication network.

U.S. Pat. No. 8,916,811B2 discloses an integrated electronics housing contains both system electronics and power generation circuits for a two-axis tracker assembly having a CPV solar array. The housing contains at least a communication bus, motion control circuits, and inverter circuits, and acts as the local system control point for that tracker mechanism. The inverter circuits generate three-phase AC voltage that is supplied to a grid interface transformer. Each inverter receives a bipolar DC voltage supplied from its own set of CPV cells. The motion control circuits move the CPV cells of the tracker mechanism to angular coordinates resulting from a solar tracking algorithm. The communication bus connects to the motion control circuits and the inverter circuits to facilitate communications of information, including parameters of power being generated by the inverter circuits, between the motion control circuits and the AC inverter circuits to fine tune the AC power generated out of the tracker mechanism.

EP2722959B1 provides a solution to the problem of starting up a PV solar plant, based on the idea of optimizing the starting parameters based on the measured active power obtained from the panel array after start-up. The measured active power is compared with a known optimal power required for a successful start-up, and the starting parameters are changed based on the comparison.

U.S. Pat. No. 7,962,249B1 discloses a central array controller for an energy generating array that includes a plurality of energy generating devices, and each energy generating device is coupled to a corresponding local converter. The central array controller includes a diagnostic module that can receive, from each local converter in the array, device data for the energy generating device corresponding to the local converter. The diagnostic module may also be capable of receiving, from each local converter in the array, local converter data for the local converter.

Some solutions are based on the solar tracker controller itself, trying to improve the implemented logic in order to speed up the process, like the solution proposed by Hanwate, Sandeep & Hote, Yogesh. (2018). *Design of PID controller for sun tracker system using QRAWCP approach. International Journal of Computational Intelligence Systems.* 11. 133. 10.2991/ijcis.11.1.11. In this paper, a direct formula is proposed for design of robust PID controller for sun tracker system using quadratic regulator approach with compensating pole (QRAWCP). The main advantage of the proposed approach is that, there is no need to use recently developed iterative soft computing techniques which are time consuming, computationally inefficient and there is need to know boundary of search space. In order to show the superiority of the proposed approach, performance of the sun tracker system is compared with the recently applied tuning approaches for sun tracker systems such as particle swarm optimization, firefly algorithm and cuckoo search algorithm. The performance of the existing and proposed approaches is verified in time domain, frequency domain also using integral performances indices as well. It is found that the performance is improved in transient, robustness, and uncertainty aspects in comparison to recently proposed soft computing approaches.

Unfortunately, it is desirable to reduce, as much as possible, the start-up time of a photovoltaic plant where a plurality of solar tracker controllers handle the different solar panels which are currently based on SCADA systems and to provide said solar tracker controllers with redundancy features so that configuration parameters are fed to the solar tracker controllers regardless of miscarries in the communication systems which may affect the start-up time.

SUMMARY OF THE INVENTION

The present invention is aimed at a method for commissioning a solar tracker and a solar tracker implementing said method, being both based on a mesh communications network yielding a self-commissioning procedure for each solar tracker in such a way that a reduction on the start-up time of a photovoltaic plant is provided. The solar tracker controller deployed by the object of the invention comprises communication means allowing the solar tracker controller to connect to communication networks, preferably wireless communication networks, using a dedicated associated gateway provided with connection means.

The method of the invention provides such a solution since it encompasses providing the solar tracker controller with the instructions required to find the appropriate communication network path and to be dynamically fed with real time, on-the-fly, configuration parameters.

The method of the invention is based on a mesh network comprising a plurality of gateways, the described self-commissioning procedure further implies a certain level of redundancy since information about auxiliary endpoints to which the controller of the solar tracker may be connected may also be provided when needed, for example in the event that an assigned or primary gateway fails to provide access.

In order to accomplish the solution hereby provided the solar tracker controller is equipped with connection means directed to connect the solar tracker controller to respective communication channels, so the solar tracker controller may establish a connection with the solar plant communication network, preferably, said connection means are antennas for wireless connection.

Solar tracker IDs and/or serial numbers and position of each tracker controller, hence each associated solar tracker, are sent to the gateways of the plant, which form part of a cluster with a shared database among all the gateways. When the solar tracker turns on and detects that it is not commissioned, it will start scanning communication channels to find a specific wireless network SSID such as "commissioning" or "gwxxxx". With this scan the solar tracker controller will form a list in order of priority according to the name and the reception power or signal quality. Then, the solar tracker controller will connect to the first item in the list and wait for the gateway to broadcast the solar tracker information.

Once the solar tracker controller has the gateways information available, the Tracker controller will indicate to the gateway that it is available for self-commissioning and will provide at least the associated serial number indicating the tracker ID, so the correspondent solar tracker information is looked up in the database. Once the gateway detects that a tracker is available for commissioning, it will locate the serial number in the database distributed among all the Gateways and will send the corresponding configuration to that tracker controller, including the information of auxiliary Gateways to connect to in case of the main gateway fails. Once the Tracker controller has its configuration parameters, it will wait for the Gateway to indicate that the commissioning has ended and that it can now connect to the assigned communication network.

Implicit in this commissioning is the issuance of configuration parameters to each tracker controller that allows, in case of failure of the main gateway, to communicate with the auxiliary gateways that have been configured in the commissioning process. It is briefly described.

Each gateway will have several antennas allowing to connect to respective different channels, preferably three working in respective wireless communication channels.

Once the commissioning is done the solar tracker will go to normal operation.

The solar tracker may periodically wait for an "alive" message from the Gateway indicating the Gateway that communications are alive; in the event that the tracker controller detects that it does not receive the message "alive" for a reasonable period of time, the tracker controller will request configuration parameters comprising auxiliary gateway data and will proceed to connect to the auxiliary gateway.

One of the most remarkable features of the object of the invention comes with the new gateway control unit which is based on a programmable device replacing the central control from previous SCADA (TMS) systems and therefore, removing the single point of failure. Each subfield is controlled by a respectively dedicated gateway working in an independent way, but all the gateways sharing their information forming a cluster with a real-time access distributed database. With this system, if a gateway fails, the solar trackers would be automatically assigned to the nearest gateway and continue working. This also yields lower temperature levels at different parts of the system. Besides, network switching is transparent since the tracker controller does not have to disconnect from the network to perform this switching.

The object of the invention also compasses the aforementioned solar tracker controller comprising a gateway associated thereof, wherein said gateway comprises in turn a plurality of connection means directed to connect to respective communication channels, said connection means having a plurality of transceivers respectively associated to antennas; antennas preferably configured to connect to respective different channel thus providing wireless connection. Some of the elements, such as the gateway and the solar tracker controller, may be enclosed in a casing.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

DETAILED DESCRIPTION

The tracker control method of the invention makes use of a mesh communications network, preferably using wireless communication networks and TCP/IP based protocols, and multiple gateways intended to provide channel information data coming from/to solar tracker controllers, said gateways acting between the mesh communication network and a solar plant communications system; each gateway is equipped with a plurality of transceivers respectively associated to antennas, providing wireless connections allowing wireless connection using different communication channels, in a preferred embodiment of the invention three antennas are provided. In such a way that the gateways generate the available networks SSIDs on one communication channel number and the solar tracker controllers are grouped and configured to connect through one communication channel number, so that every single solar tracker controller in one group connects to a gateway though a matching communication channel.

The method of the invention encompasses assigning each solar tracker controller a unique serial number to be used in the commissioning or commissioning procedure wherein each unique serial number is associated to the correspondent position of the respective solar tracker by means of subfield data arranged along the unique serial number; hence information regarding which solar tracker and where in the solar plant are determined and preferably stored in a database accessible by the gateways.

This information will be sent to the plant gateways that will designedly be part of a cluster and will have a database shared among all gateways.

Figure 1:
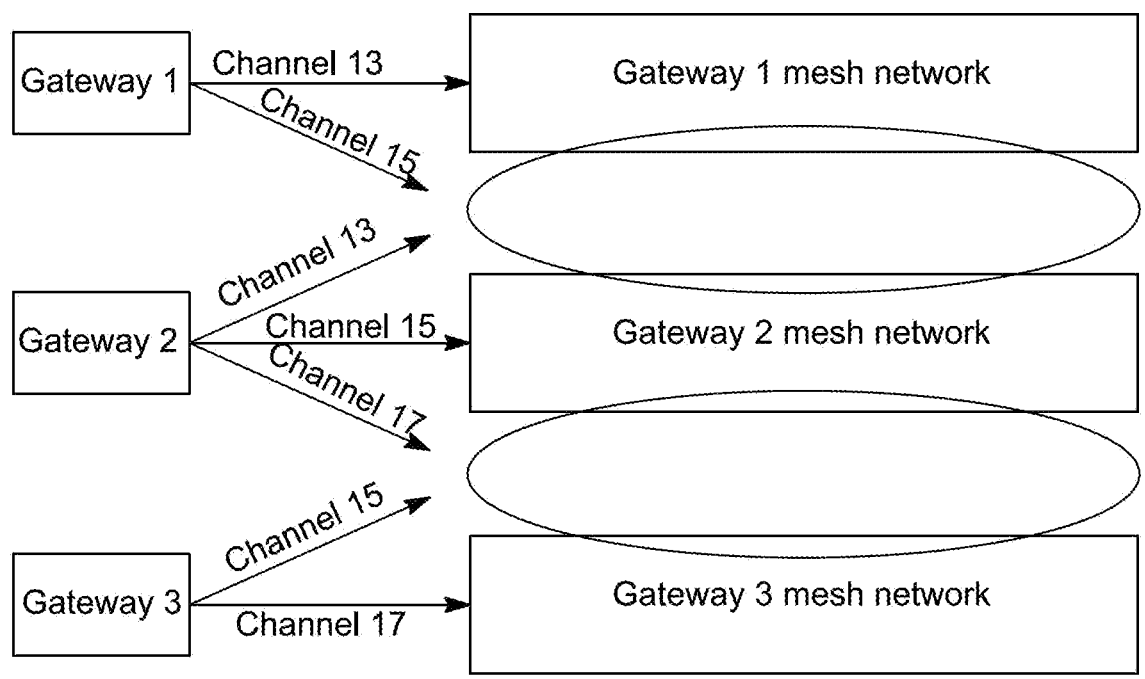
FIG. 1. Shows a diagram illustrating the gateways and channels used by each network.
Figure 2:
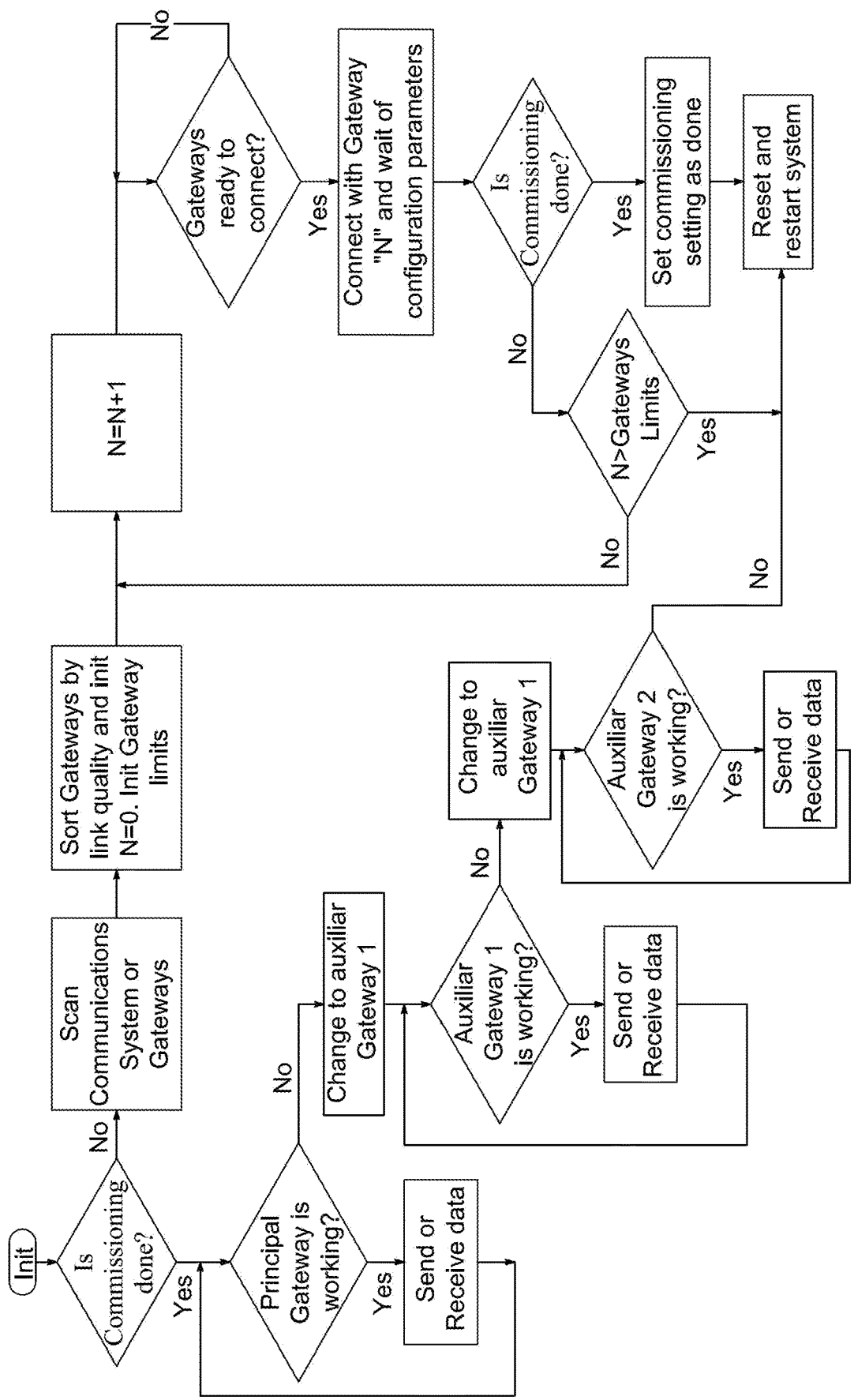
FIG. 2. Shows a flow diagram illustrating the object of the invention.

Once a solar tracker is turned on and the solar tracker controller detects that it is not yet commissioned a scan process is triggered scanning communication channels to look for a certain communication network which is identified by an specific network ID format, in this preferred embodiment said certain communication network may have an SSID: "commissioning" or "gwxxxx". Hence all the process related to commissioning is handled by the respective gateway as depicted in FIG. 2 wherein the networks are represented as numbered generic names as "gateway n mesh network".

By means of this scan procedure, the solar tracker controller may form a list of wireless networks arranged in order of priority, preferably depending on the name and the receiving power or signal quality. Once the list of available wireless networks is available, the solar tracker controller will connect to the first listed communication network on the list and wait for the gateway to send the respective information via a broadcast procedure following the process depicted on FIG. 2.

Once the solar tracker controller has gateway information available, the solar tracker controller will indicate to the gateway its serial number also indicating that it is available for self-commissioning.

Once the gateway determines a solar tracker as available for commissioning the serial number in the distributed database among all gateways is identified and send corresponding configuration information in the form of tracker controller configuration parameters to that solar tracker controller of the solar tracker being available for commissioning; said solar configuration parameters may comprise at least one of: positioning angles, maximum angle, position of the associated solar tracker in plant, auxiliary an gateways data to connect to in case the primary gateway fails.

As soon as a solar tracker controller has received the configuration parameters, it waits for the gateway to generate a message, preferably via broadcast, indicating that the commissioning has ended and so the solar tracker controller can already connect to an assigned communications network.

During the commissioning procedure depicted in FIG. 2, it is provided a process of issuance of configuration parameters to each solar tracker controller that allows in case of primary gateway failure to communicate with the auxiliary gateways that had been configured in the commissioning process.

Once the commissioning is performed, the solar tracker controller will go into a normal operation mode where the solar tracker controller is able to send/receive commands from the solar tracker controller and configuration parameters may be modified.

The solar tracker controller will periodically wait for an "alive" message from the gateway indicating the gateway that I am still available to communicate. If the solar tracker controller detects that it does not receive, during a predetermined period of time, preferably set within 15 seconds and 15 minutes, an status message such as "alive", the solar tracker controller starts a query process for configuration parameters, determining an auxiliary gateway and connecting to said auxiliary gateway.

Since the whole network structure for the gateways is based on a mesh network, switching processes are transparent as the solar tracker controller does not have to disconnect from the network to perform a switching process.

What is claimed is:
1. A method of commissioning a solar plant,
wherein each solar tracker controller comprising wireless communication means, and
wherein multiple gateways arranged in a mesh communications network; said gateways acting between the mesh communication network and a solar plant communications system,
the method comprising the steps of:
assigning each solar tracker controller, a unique serial number comprising:
ID, and
position on the solar plant, of the solar tracker associated to said solar tracker controller; so that the gateways have access to said unique serial number,
the gateways generating at least one wireless communication network which is identified by a specific network SSID through which the gateway broadcasts configuration parameters to the solar tracker controllers,
the solar tracker controller scanning communication channels to look for a wireless communication network which is identified by a specific network SSID,
the solar tracker controller generating a list of available wireless communication network which is identified by a specific network SSID to which each solar tracker controller may connect, said listing being sorted in order of priority depending on at least one of: receiving power and signal quality, each solar tracker controller connecting to the first network listed on the list and sending data regarding the solar tracker controller status as commissioned or non-commissioned along with solar tracker ID data, the gateway receiving data of a solar tracker as being available for commissioning and sending associated configuration data to the solar tracker controller of said solar tracker available for commissioning, said configuration data including information of auxiliary gateways to connect to in case a gateway to which the tracker controller is connected to fails, receiving on the solar tracker controller information comprising the associated configuration parameters, sending an end of commissioning procedure from gateways to the solar tracker controllers, and resetting the solar tracker controller.

2. The method according to claim 1, wherein the order of priority further comprises an alphabetical order of the available networks SSIDs.

3. The method according to claim 1, wherein the solar tracker controller configuration parameters comprises at least one of: positioning angles, maximum angle, position of the associated solar tracker in plant, and auxiliary gateways data.

4. The method according to claim 1, wherein the gateways generate the available networks SSIDs on one communication channel number and the solar tracker controllers are grouped and configured to connect through one communication channel number, so that every single solar tracker controller in one group connects to a gateway through a matching communication channel.

5. The method according to claim 1, wherein the determination of the solar tracker as being available for commissioning is done by means of a message sent from the solar tracker controller to the gateway.

6. A solar tracker controller comprising:
a gateway associated therein,
the gateway comprising in turn a plurality of connection means directed to connect to respective communication channels, said solar tracker controller being configured to carry out the method of
assigning each solar tracker controller, a unique serial number comprising:
ID, and
position on the solar plant, of the solar tracker associated to said solar tracker controller; so that the gateways have access to said unique serial number, the gateways generating at least one wireless communication network which is identified by a specific network SSID through which the gateway broadcasts configuration parameters to the solar tracker controllers, the solar tracker controller scanning communication channels to look for a wireless communication network which is identified by a specific network SSID, the solar tracker controller generating a list of available wireless communication network which is identified by a specific network SSID to which each solar tracker controller may connect, said listing being sorted in order of priority depending on at least one of: receiving power and signal quality, each solar tracker controller connecting to the first network listed on the list and sending data regarding the solar tracker controller status as commissioned or non-commissioned along with solar tracker ID data, the gateway receiving data of a solar tracker as being available for commissioning and sending associated configuration data to the solar tracker controller of said solar tracker available for commissioning, said configuration data including information of auxiliary gateways to connect to in case a gateway to which the tracker controller is connected to fails, receiving on the solar tracker controller information comprising the associated configuration parameters, sending an end of commissioning procedure from gateways to the solar tracker controllers, and resetting the solar tracker controller.

7. The solar tracker controller of claim 6, wherein the connection means comprises a plurality of transceivers respectively associated to antennas, providing wireless connection.

8. The solar tracker controller of claim 7, wherein the antennas are respectively configured to connect to respective different channels.

9. The solar tracker controller of claim 6, wherein the gateway and the solar tracker controller are enclosed in a casing.

* * * * *